(12) United States Patent
Yakuwa (10) Patent No.: US 8,554,164 B2
(45) Date of Patent: Oct. 8, 2013

(54) DUAL POLARIZATION TRANSMISSION SYSTEM, DUAL POLARIZATION TRANSMISSION METHOD, RECEPTION APPARATUS, TRANSMISSION APPARATUS, RECEPTION METHOD, AND TRANSMISSION METHOD

(75) Inventor: Naoki Yakuwa, Tokyo (JP)

(73) Assignee: NEC Corporation, Tokyo (JP)

( * ) Notice: Subject to any disclaimer, the term of this patent is extended or adjusted under 35 U.S.C. 154(b) by 87 days.

(21) Appl. No.: 13/144,827

(22) PCT Filed: Jan. 26, 2010

(86) PCT No.: PCT/JP2010/050973
§ 371 (c)(1),
(2), (4) Date: Jul. 18, 2011

(87) PCT Pub. No.: WO2010/087338
PCT Pub. Date: Aug. 5, 2010

(65) Prior Publication Data
US 2011/0274218 A1    Nov. 10, 2011

(30) Foreign Application Priority Data
Jan. 28, 2009    (JP) .................................. 2009-016667

(51) Int. Cl.
*H04B 1/06* (2006.01)
*H04B 7/00* (2006.01)
(52) U.S. Cl.
USPC ........ 455/260; 455/323; 455/334; 455/553.1; 375/340

(58) Field of Classification Search
USPC ......... 455/101, 108, 110, 255–206, 313, 323, 455/334, 550.1, 552.1, 553.1; 375/295, 340
See application file for complete search history.

(56) References Cited

U.S. PATENT DOCUMENTS

| | | | |
|---|---|---|---|
| 6,282,249 B1 | 8/2001 | Tomesen et al. | |
| 2001/0006900 A1* | 7/2001 | Hanninen | 455/553 |
| 2005/0107055 A1* | 5/2005 | Bult et al. | 455/234.1 |
| 2007/0049330 A1* | 3/2007 | Kim et al. | 455/552.1 |
| 2010/0136916 A1 | 6/2010 | Kawai | |

FOREIGN PATENT DOCUMENTS

| | | |
|---|---|---|
| EP | 1365519 A | 11/2003 |
| EP | 1708381 A | 10/2006 |
| JP | 63-222534 A | 9/1986 |
| JP | 2-246538 A | 10/1990 |
| JP | 2000165339 A | 6/2000 |

(Continued)

OTHER PUBLICATIONS

International Search Report for PCT/JP2010/050973 mailed Mar. 16, 2010.

(Continued)

*Primary Examiner* — Nhan Le (57) ABSTRACT

A receiving device of a dual polarization transmission system includes: a receiver that receives an RF signal that is transmitted with the use of two orthogonal polarizations; two reception local oscillators that include PPL circuits to convert the received RF signal of each of the polarizations into an IF signal; and a demodulator that demodulates an IF signal of one polarization, which is obtained by the conversion, into a baseband signal. The reception local oscillators control a loop band of the PLL circuits in response to a signal from the demodulator.

8 Claims, 5 Drawing Sheets

(56) References Cited

FOREIGN PATENT DOCUMENTS

| | | |
|---|---|---|
| JP | 2002158630 A | 5/2002 |
| JP | 2002515205 A | 5/2002 |
| JP | 2004172975 A | 6/2004 |
| JP | 3565160 B | 9/2004 |
| JP | 2004364055 A | 12/2004 |
| JP | 2005269512 A | 9/2005 |
| JP | 2007103900 A | 4/2007 |
| WO | 2007046427 A | 4/2007 |
| WO | 2007057911 A | 5/2007 |
| WO | 2008126852 A1 | 10/2008 |

OTHER PUBLICATIONS

Japanese Office Action for JP2010-548519 mailed on Dec. 26, 2012.

\* cited by examiner

DUAL POLARIZATION TRANSMISSION SYSTEM, DUAL POLARIZATION TRANSMISSION METHOD, RECEPTION APPARATUS, TRANSMISSION APPARATUS, RECEPTION METHOD, AND TRANSMISSION METHOD

This application is the National Phase of PCT/JP2010/050973, filed Jan. 26, 2010, which is based upon and claims the benefit of priority from Japanese patent application No. 2009-016667, filed on Jan. 28, 2009, the disclosure of which is incorporated herein in its entirety by reference.

TECHNICAL FIELD

The present invention relates to a dual polarization transmission system, dual polarization transmission method, receiving device, transmitting device, receiving method and transmitting method that use a reference synchronous scheme in which transmission takes place using two orthogonal polarizations, and particularly to a technique of removing a cross polarization interference component between both polarizations.

BACKGROUND ART

For digital microwave communication, a dual polarization transmission method is used to use frequency more efficiently: According to the dual polarization transmission method, orthogonal polarizations, a vertical polarization (referred to as V-polarization, hereinafter) and a horizontal polarization (referred to as H-polarization, hereinafter), of a radio wave are transmitted at the same frequency. According to the above method, the use of the same frequency for the vertical polarization and horizontal polarization, as well as the orthogonality of an antenna or space, is not perfect. Therefore, both polarizations leak into each other. The leakage is called cross polarization interference, having a negative effect on the transmission quality of signals. In particular, when the dual polarization transmission method is used together with a multiple-valued modulation/demodulation method such as QAM (Quadrature Amplitude Modulation), the effect is significant.

Accordingly, interference components are removed by a cross polarization interference compensator (XPIC: Cross Polarization Interference Canceller). A polarization that the XPIC handles is defined as one polarization, and a polarization crossing one polarization at right angles as the other polarization. To compensate for interference from the other polarization, synchronization of the local oscillation (local) frequencies of one polarization and the other polarization is important.

What is disclosed in PTL1 is about a reception local synchronous method as a local synchronous method. There are two reception local synchronous methods: a common local method, in which one local oscillator is shared by a one-polarization receiver and an other-polarization receiver; and a reference synchronous scheme, in which a one-polarization receiver and an other-polarization receiver each have separate local oscillators, with a reference signal (Reference Signal) of each local oscillator shared.

According to the common local method, the configuration of a circuit is simple. However, if the local oscillator breaks down, signals of both polarizations could be turned off at the same time. Conversely, according to the reference synchronous scheme, the configuration of a circuit is complex. However, if a local oscillator breaks, the effects can be limited to either one polarization or the other polarization. Therefore, in many cases, the system is highly redundant with the use of the reference synchronous scheme in order to improve the efficiency in using radio waves.

Figure 3:
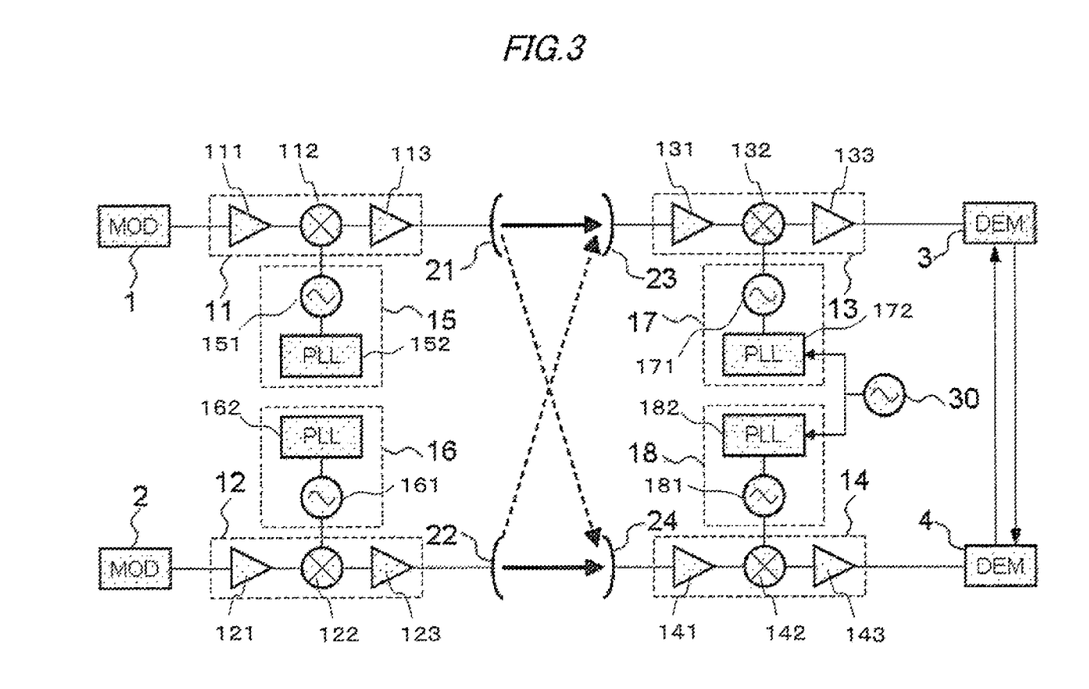
FIG. 3 A block configuration diagram showing the overall configuration of a dual polarization transmission system of a reception local synchronous type that uses reference synchronization according to a related technique.

FIG. 3 is a block diagram showing the configuration of a transmitting/receiving system of a reception local synchronous type with the use of the reference synchronous scheme, which is a related technique.

In the case of FIG. 3, the following components are provided at a transmitting side: modulators (V/H modulators) 1 and 2 for V- and H-polarizations; transmitters (V/H transmitters) 11 and 12 for V- and H-polarizations; transmitter local oscillators (V/H transmitter local oscillators) 15 and 16 for V- and H-polarizations; and transmitting antennas (V/H transmitting antennas) 21 and 22 for V- and H-polarizations. The V/H transmitters 11 and 12 respectively include front stage-side amplifiers 111 and 121, mixers (multipliers) 112 and 122, subsequent stage-side amplifiers (power amplifiers) 113 and 123. The V/H transmitter local oscillators 15 and 16 respectively include PLL (Phase Locked Loop) circuits 152 and 162 having VCOs (Voltage Controlled Oscillators) 151 and 161.

The following components are provided at a receiving side: receiving antennas (V/H receiving antennas) 23 and 24 for V-/H-polarizations; receivers (V/H receivers) 13 and 14 for V-/H-polarizations; receiver local oscillators (V/H receiver local oscillators) 17 and 18 for V-/H-polarizations; and demodulators (V/H demodulators) 3 and 4 for V-/H-polarizations. On the receiving side, a reference circuit 30 is also provided that outputs a common reference signal to the V/H receiver local oscillators 17 and 18. The V/H receivers 13 and 14 respectively include front stage-side amplifiers (low noise amplifiers) 131 and 141, mixers 132 and 142, and subsequent stage-side amplifiers 133 and 143. The V/H receiver local oscillators 17 and 18 respectively include PLL circuits 172 and 182 having VCOs 171 and 181. The V/H demodulators 3 and 4 each include a XPIC (not shown) that accepts a demodulation signal of the other polarization-side V/H demodulators 3 and 4 and obtains a correlation between the demodulation signal and an error signal obtained from one polarization to eliminate cross polarization interference components.

According to the above configuration, at the transmitting side, signals of V- and H-polarizations are modulated from baseband signals to IF (Intermediate Frequency) signals in the V/H modulators 1 and 2. After the modulation, the IF signals pass through the V/H transmitters 11 and 12, respectively, before being multiplied by outputs of the V/H transmitter local oscillators 15 and 16. In this manner, frequency conversion takes place from IF signals to RF (Radio Frequency) signals. After the conversion, the RF signals are transmitted as radio waves of V- and H-polarizations from the V/H transmitting antennas 21 and 22, respectively.

At the receiving side, the V/H receiving antennas 23 and 24 receive radio waves of the V- and H-polarizations, respectively, which have travelled through a space from the transmitting side. The received radio waves of V- and H-polarizations respectively pass through the receivers 13 and 14 from the V/H receiving antennas 23 and 24 before being multiplied by outputs of the V/H receiver local oscillators 17 and 18. In this manner, frequency conversion takes place from RF signals to IF signals. After the conversion, the IF signals are output to the V/H demodulators 3 and 4, respectively, which demodulate the IF signals into baseband signals. At this time, in the V/H demodulator 3, a correlation between an error signal obtained from one polarization and a demodulation signal of the other polarization-side V/H demodulator 4 is obtained to compensate for cross polarization interference. A similar Operation takes place even in the V/H demodulator 4.

According to the above reception local synchronous method, outputs of the V/H receiver local oscillators 17 and 18 (outputs of VCOs 171 and 181) are each controlled by the operation of the PLL circuits 172 and 182 so as to have the same frequency in synchronization with a common reference signal from the reference circuit 30.

Regarding the above, what is disclosed in PTL 2 is a dual polarization transmission system that uses a transmission local synchronous method as a reference synchronous scheme. The dual polarization transmission system uses a digital demodulator of a semi-synchronous type and an XPIC, and controls the phase of oscillation of a numerically controlled oscillator (NCO) on the basis of a signal from a modulator, thereby tracking a phase difference between other polarizations and eliminating an interference wave.

CITATION LIST

Patent Literature

{PTL 1} JP-A-63-222534
{PTL 2} JP-A-2000-165339

SUMMARY OF INVENTION

Technical Problem

What is important with an XPIC method is that the frequency of one polarization is the same as the frequency of the other polarization, as well as that changes of the phase are small in terms of time. That is, what is important is to have not only the same frequency but also the phase noise components synchronized as much as possible in one polarization and the other polarization.

Typically, a local oscillator used in an RF stage has a large phase noise. For a phase margin of a system including a transmitter and receiver, the phase noise of the local oscillator of the RF stage is dominant. Regarding the phase noise, the phase margin is determined by integrating a specific frequency component.

Figure 4:
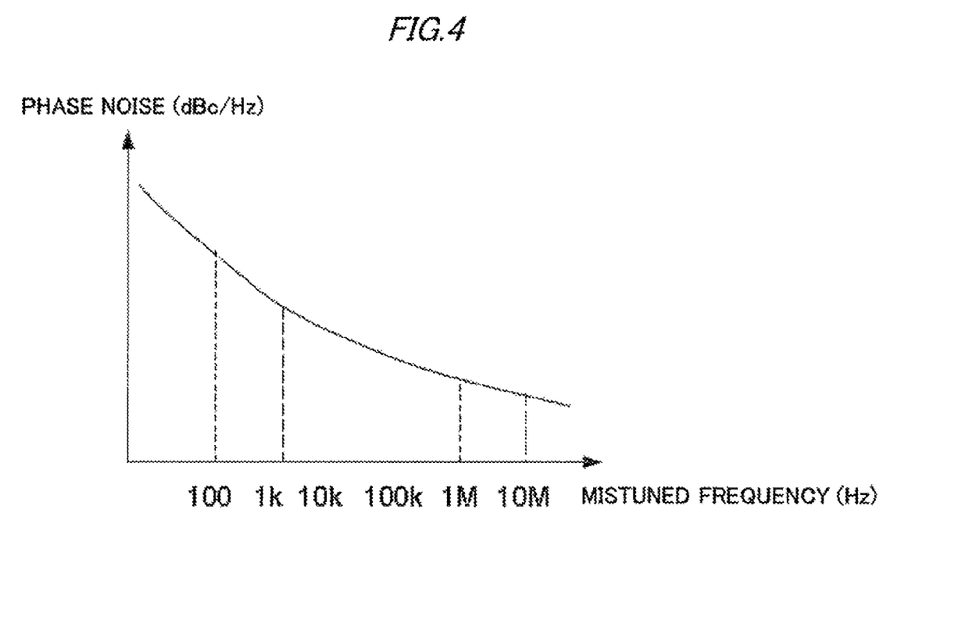
FIG. 4 A graph showing a phase noise characteristic at a time when a PLL of an RF-stage local oscillator is not used.
Figure 5:
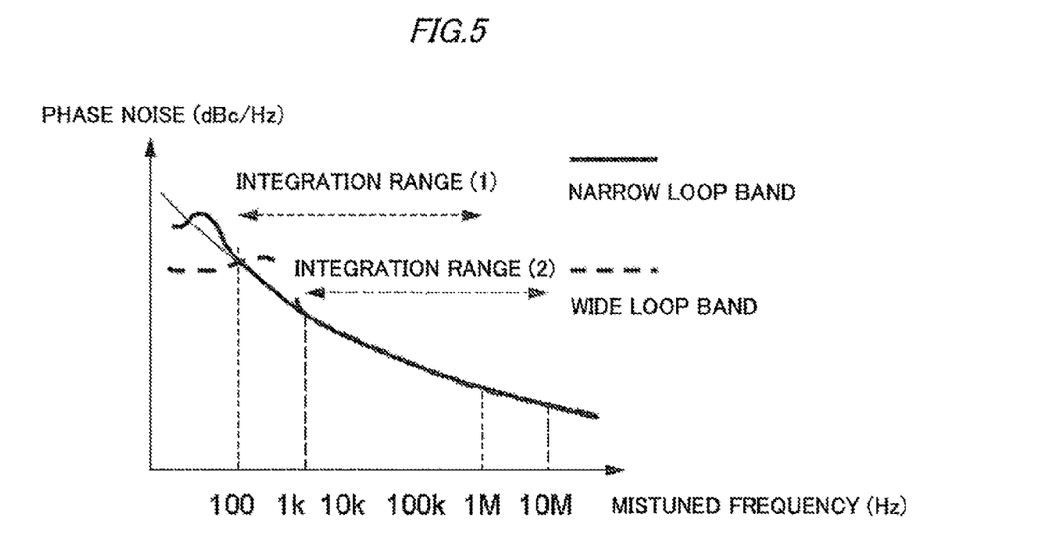
FIG. 5 A graph showing an integration range of a demodulator for a phase noise characteristic of an RF-stage local oscillator.

An integration range thereof is determined by properties of a demodulator. The integration range shifts to a low or broad range depending on a transmission capacity. For example, as for the phase noise characteristic of the local oscillator of the RF stage as shown in FIG. 4 (Horizontal axis: mistuned frequency [Hz], Vertical axis: phase noise [dBc/Hz]), the integration range of the phase noise is integration range (1) as shown in FIG. 5 in the case of 16 QAM with a small transmission capacity (Transmission capacity: several hundred Mbits/sec), or integration range (2) in the case of 256 QAM (Transmission capacity: several hundred Mbits/sec). In this manner, the integration range of the phase noise varies according to the transmission capacity.

The phase margin is equal to the size of the integration range. If the integration range has a region where the phase noise is degraded, the size increases. That is, the phase margin deteriorates. Therefore, in order to prevent a region where the phase noise is degraded from appearing in the integration range, it is necessary for a loop band to be lower than the integration range.

Figure 6:
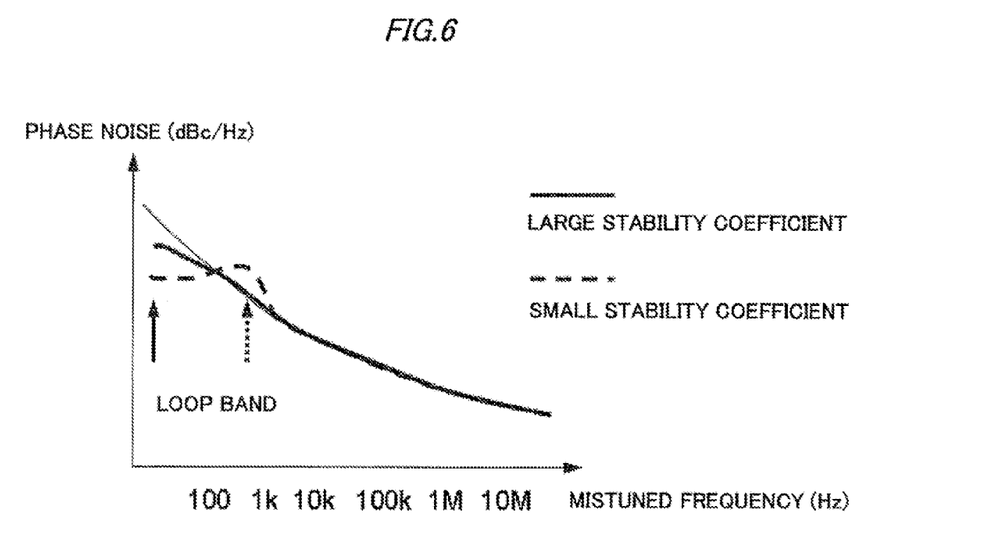
FIG. 6 A graph showing changes at a time when a stability coefficient is changed for a phase noise characteristic of an RF-stage local oscillator.

A typical feature of a PLL is as follows: As shown in FIG. 6, when a stability coefficient is made smaller and when the loop band is elongated to a high range as much as possible, the phase noise around the loop band becomes worse compared with the phase noise of the local oscillator.

Meanwhile, the total phase noise of the local oscillator is determined based on the phase noise of a phase comparator, the phase noise of the oscillator, the phase noise of a reference signal, and the loop band of the local oscillator. For example, as the loop band of the local oscillator becomes wider, a range for tracking a reference signal becomes wider. However, the phase noise at a low frequency range-side deteriorates. Meanwhile, as the loop band of the local oscillator becomes narrower, there is an improvement in the low frequency range-side phase noise. However, the range of tracking the reference signal becomes narrower.

Therefore, in the case of 16 QAM with a small transmission capacity, it is impossible to make the loop band of the local oscillator wider in order to keep the low frequency range-side phase noise from deteriorating. On the other hand, in the case of 256 QAM with a larger transmission capacity than 16 QAM, it is possible to widen the loop band of the local oscillator while keeping the effects of deterioration of the low frequency range-side phase noise small. However, in a conventional XPIC system of a reception reference synchronous type, the loop band of the local oscillator remains unchanged at a constant level relative to the transmission capacity. Accordingly, a frequency range for synchronization between a one-polarization local oscillator and an other-polarization local oscillator is narrow, and there is a limit to the synchronization of phase noise components.

In recent years, even a dual polarization transmission system has been requiring a method of dynamically switching modulation methods, called AMR (Adaptive Multi Rate). What is required for any modulation method is to maximize the performance of cross polarization interference compensation.

Therefore, the problem with a dual polarization transmission system using a conventional XPIC of a reception reference synchronous type is that when the system is multiple-valued, as in 128 QAM or 256 QAM with a larger transmission capacity than 16 QAM, the performance of cross polarization interference compensation deteriorates.

In view of the above problem, an object of the present invention is to provide a dual polarization transmission system that can curb the deterioration of an XPIC characteristic that is attributable to the local phase noise of one polarization and the other polarization even when the dual polarization transmission system that uses an XPIC of a reference synchronous type is multiple-valued so as to be of a multiple-valued modulation/demodulation type with a large transmission capacity.

Solution to Problem

To achieve the above object, a receiving device of a dual polarization transmission system that uses a reference synchronous scheme of the present invention includes: a receiver that receives an RF signal that is transmitted with the use of two orthogonal polarizations; two reception local oscillators that include PPL circuits to convert the received RF signal of each of the polarizations into an IF signal; and a demodulator that demodulates an IF signal of one polarization, which is obtained by the conversion, into a baseband signal, wherein the reception local oscillators control a loop band of the PLL circuits in response to a signal from the demodulator.

A transmitting device of a dual polarization transmission system that uses a reference synchronous scheme of the present invention includes: a modulator that modulates a baseband signal into an IF signal; a transmission local oscillator that includes a PLL circuit to convert an IF signal to an RF signal; and a transmitter that transmits the RF signal, which is obtained by the conversion, using two orthogonal polarizations, wherein the transmission local oscillator controls a loop band of the PLL circuit in response to a signal from the modulator.

A receiving method of a dual polarization transmission system that uses a reference synchronous scheme of the present invention, includes: receiving, at a receiver, an RF signal that is transmitted with the use of two orthogonal polarizations; converting, at two reception local oscillators including PPL circuits, the received RF signal of each of the polarizations into an IF signal; demodulating, at a demodulator, an IF signal of one polarization, which is obtained by the conversion, into a baseband signal; and controlling, at the reception local oscillators, a loop band of the PLL circuits in response to a signal from the demodulator.

A transmitting method of a dual polarization transmission system that uses a reference synchronous scheme of the present invention, includes: modulating, at a modulator, a baseband signal into an IF signal; converting, at a transmission local oscillator including a PLL circuit, an IF signal to an RF signal; transmitting, at a transmitter, the RF signal, which is obtained by the conversion, using two orthogonal polarizations; and controlling, at the transmission local oscillator, a loop band of the PLL circuit in response to a signal from the modulator.

A first dual polarization transmission system of the present invention includes the receiving device described above, and uses the receiving device to receive a signal that is transmitted by using two orthogonal polarizations.

A second dual polarization transmission system of the present invention includes the transmitting device described above, and uses the transmitting device to transmit a signal that should be transmitted by using two orthogonal polarizations.

A first dual polarization transmission method of the present invention includes receiving, with the use of the receiving method described above, a signal that is transmitted by using two orthogonal polarizations.

A second dual polarization transmission method of the present invention includes transmitting, with the use of the transmitting method described above, a signal that should be transmitted by using two orthogonal polarizations.

Advantageous Effects of Invention

According to the present invention, it is possible to curb the deterioration of an XPIC characteristic that is attributable to the local phase noise of one polarization and the other polarization even when the dual polarization transmission system that uses an XPIC of a reference synchronous type is multiple-valued so as to be of a multiple-valued modulation/demodulation type with a large transmission capacity.

DESCRIPTION OF EMBODIMENTS

Hereinafter, exemplary embodiments of a dual polarization transmission system, dual polarization transmission method, receiving device, transmitting device, receiving method and transmitting method that use a reference synchronous scheme of the present invention will be described in detail with reference to the accompanying drawings.

First Exemplary Embodiment

Figure 1:
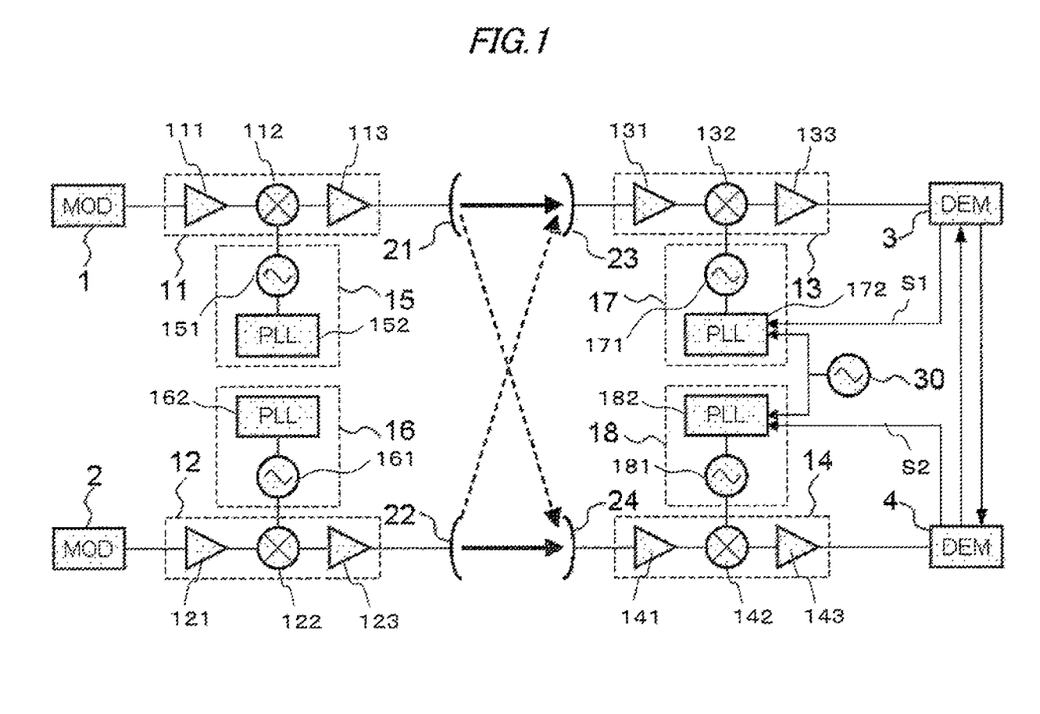
FIG. 1 A block configuration diagram showing the overall configuration of a dual polarization transmission system of a reception local synchronous type that uses reference synchronization according to a first exemplary embodiment of the present invention.

FIG. 1 is a block configuration diagram of a dual polarization transmission system (transmitting/receiving system) of a reception local synchronous type that uses reference synchronization, showing a first exemplary embodiment of the present invention. The same components as those of the related technique shown in FIG. 4 are indicated by the same reference symbols and will be simply described.

In FIG. 1, the following components are provided at a transmitting side (or in a transmitting device): V/H modulators 1 and 2; V/H transmitters 11 and 12; V/H transmitter local oscillators 15 and 16; and V/H transmitting antennas 21 and 22. The V/H transmitters 11 and 12 respectively include front stage-side amplifiers 111 and 121, mixers 112 and 122, subsequent stage-side amplifiers 113 and 123. The V/H transmitter local oscillators 15 and 16 respectively include PLL circuits 152 and 162 having VCOs 151 and 161.

The following components are provided at a receiving side (or in a receiving device): V/H receiving antennas 23 and 24; V/H receivers 13 and 14; V/H receiver local oscillators 17 and 18; and V/H demodulators 3 and 4. At the receiving side, a reference circuit 30 is also provided that outputs a common reference signal to the V/H receiver local oscillators 17 and 18. The V/H receivers 13 and 14 respectively include front stage-side amplifiers 131 and 141, mixers 132 and 142, and subsequent stage-side amplifiers 133 and 143. The V/H receiver local oscillators 17 and 18 respectively include PLL circuits 172 and 182 having VCOs 171 and 181. The V/H demodulators 3 and 4 each include an XPIC (not shown) that accepts a demodulation signal of the other polarization-side V/H demodulators 3 and 4 and obtains a correlation between the demodulation signal and an error signal obtained from one polarization to eliminate cross polarization interference components.

The PLL circuits 172 and 182 include a function of controlling the varying of a loop band depending on whether a transmission capacity, such as QAM capacity, is large or small (Example: 16 QAM, 256 QAM) in response to control signals S1 and S2, which are obtained after the V/H demodulators 3 and 4 demodulate. For the function, a publicly known PLL technique can be applied. Therefore, the function will not be described in detail.

According to the above configuration, at the transmitting side, signals of V- and H-polarizations are modulated from baseband signals to IF signals in the V/H modulators 1 and 2. After the modulation, the IF signals pass through the V/H transmitters 11 and 12, respectively, before being multiplied by outputs of the V/H transmitter local oscillators 15 and 16. In this manner, frequency conversion takes place from IF signals to RF signals. After the conversion, the RF signals are transmitted as radio waves of V- and H-polarizations from the V/H transmitting antennas 21 and 22, respectively.

At the receiving side, the V/H receiving antennas 23 and 24 receive radio waves of the V- and H-polarizations, respectively, which have travelled through a space from the transmitting side. The received radio waves of V- and H-polarizations respectively pass through the receivers 13 and 14 from the V/H receiving antennas 23 and 24 before being multiplied by outputs of the V/H receiver local oscillators 17 and 18. In this manner, frequency conversion takes place from RF signals to IF signals. After the conversion, the IF signals are output to the V/H demodulators 3 and 4, respectively, which demodulate the IF signals into baseband signals. At this time, in the V/H demodulator 3, a correlation between an error signal obtained from one polarization and a demodulation signal of the other polarization-side V/H demodulator 4 is obtained to compensate for cross polarization interference. A similar operation takes place even in the V/H demodulator 4.

According to the above reception local synchronous method, outputs of the V/H receiver local oscillators 17 and 18 (outputs of VCOs 171 and 181) are each controlled by the operation of the PLL circuits 172 and 182 so as to have the same frequency in synchronization with a common reference signal from the reference circuit 30.

According to the present exemplary embodiment, in response to control signals S1 and S2 from the demodulators 3 and 4, the V/H receiver local oscillators 17 and 18 narrow the loop band of the PLL circuits 172 and 182, for example, in the case of 16 QAM, which means that the QAM capacity is small. For example, in the case of 256 QAM, which means that the QAM capacity is large, the receiver local oscillators 17 and 18 control so as to widen the loop band of the PLL circuit 172 and 182 of the V/H receiver local oscillators 17 and 18.

The following description is based on the above example shown in FIG. 5. In response to control signals S1 and S2 from the V/H demodulators 3 and 4, the V/H receiver local oscillators 17 and 18 control, in the case of, for example, 16 QAM (Transmission capacity: several Mbits/Sec), which means the QAM capacity is small (first transmission capacity), so that the loop band of the PLL circuits 172 and 182 is narrower than integration range (1) (first integration range) of the V/H demodulators 3 and 4. For example, in the case of the example shown in FIG. 5, the loop band of the PLL circuits 172 and 182 is so controlled as to be narrower than about 100 Hz.

Meanwhile, in response to control signals S1 and S2 from the V/H demodulators 3 and 4, the V/H receiver local oscillators 17 and 18 control, in the case of, for example, 256 QAM (Transmission capacity: several hundred Mbits/Sec), which means the QAM capacity is large (second transmission capacity), so that the loop band of the PLL circuits 172 and 182 of the V/H receiver local oscillators 17 and 18 is wider than the above case, to the extent that integration range (2) (second integration range) of the V/H demodulators 3 and 4 is not affected. For example, in the case of the example shown in FIG. 5, the loop band of the PLL circuits 172 and 182 is so controlled as to be wider than 100 Hz and reach up to about 1 kHz (About 1 kHz is desirable in the example shown in FIG. 5). In this case, at a low range side, the deterioration of the phase noise is larger than the former. However there is no impact because the deterioration of the phase noise is outside the integration range.

Therefore, according to the present exemplary embodiment, in response to the control signals S1 and S2 from the V/H demodulators 3 and 4, the loop band of the PLL circuits 172 and 182 of the V/H receiver local oscillators 17 and 18 is controlled according to the magnitude of the QAM capacity (the first transmission capacity, and the second transmission capacity larger than the first transmission capacity). Therefore, the integrated value of phase noise of the V/H receiver local oscillators 17 and 18 can be brought to the smallest value for each of the different QAM capacities. Thus, even when the system is multiple-valued so as to be of 256 QAM, whose transmission capacity is larger than 16 QAM, it is possible to curb the deterioration of an XPIC characteristic.

That is, according to the present exemplary embodiment, in response to the control signals S1 and S2 from the V/H demodulators 3 and 4, the loop band of the PLL circuits 172 and 182 of the V/H receiver local oscillators 17 and 18 is controlled. Therefore, it is possible to make the following factors equal: the frequencies of the V/H receiver local oscillators 17 and 18 of one polarization and the other polarization. It is also possible to align the phases of the V/H receiver local oscillators 17 and 18 of one polarization and the other polarization. Thus, it is possible to curb the deterioration of an XPIC characteristic that is attributable to the local phase noise of one polarization and the other polarization in the XPIC of a reception reference synchronous type.

As described above, according to the present exemplary embodiment, in the XPIC system of a reference synchronous type, even when the system is multiple-valued so as to be of 128 QAM, 256 QAM or the like rather than 16 QAM or the like, it is possible to provide a means for preventing the deterioration in cross polarization interference compensation characteristics that is attributable to the local phase noise of one polarization and the other polarization.

Second Exemplary Embodiment

Figure 2:
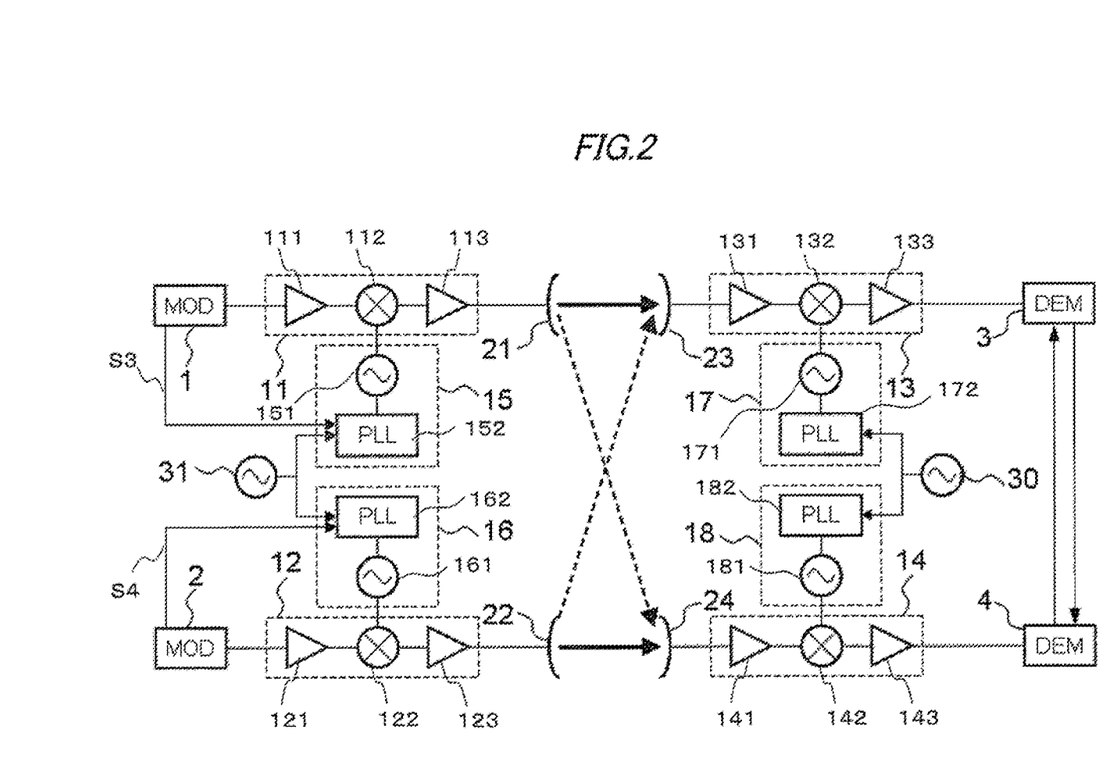
FIG. 2 A block configuration diagram showing the overall configuration of a dual polarization transmission system of a transmission local synchronous type that uses reference synchronization according to a second exemplary embodiment of the present invention.

FIG. 2 is a block configuration diagram of a dual polarization transmission system (transmitting/receiving system) of a transmission local synchronous type that uses reference synchronization, showing an exemplary embodiment of the present invention. The same components as those of the first exemplary embodiment shown in FIG. 1 are indicated by the same reference symbols and will be simply described.

In FIG. 2, the following components are provided at a transmitting side (or in a transmitting device): V/H modulators 1 and 2; V/H transmitters 11 and 12; V/H transmitter local oscillators 15 and 16; and V/H transmitting antennas 21 and 22. At the transmitting side, a reference circuit 31 is also provided to output a common reference signal to the V/H transmitter local oscillators 15 and 16. The V/H transmitters 11 and 12 respectively include front stage-side amplifiers 111 and 121, mixers 112 and 122, subsequent stage-side amplifiers 113 and 123. The V/H transmitter local oscillators 15 and 16 respectively include PLL circuits 152 and 162 having VCOs 151 and 161.

The following components are provided at a receiving side (or in a receiving device): V/H receiving antennas 23 and 24; V/H receivers 13 and 14; V/H receiver local oscillators 17 and 18; and V/H demodulators 3 and 4. At the receiving side, a reference circuit 30 is also provided that outputs a common reference signal to the V/H receiver local oscillators 17 and 18. The V/H receivers 13 and 14 respectively include front stage-side amplifiers 131 and 141, mixers 132 and 142, and subsequent stage-side amplifiers 133 and 143. The V/H receiver local oscillators 17 and 18 respectively include PLL circuits 172 and 182 having VCOs 171 and 181. The V/H demodulators 3 and 4 each include an XPIC (not shown) that accepts a demodulation signal of the other polarization-side V/H demodulators 3 and 4 and obtains a correlation between the demodulation signal and an error signal obtained from one polarization to eliminate cross polarization interference components.

The PLL circuits 152 and 162 include a function of controlling the varying of a loop band depending on whether a transmission capacity, such as QAM capacity, is large or small (Example: 16 QAM, 256 QAM) in response to control signals S3 and S4, which are obtained after the V/H modulators 1 and 2 modulate. For the function, a publicly known PLL technique can be applied. Therefore, the function will not be described in detail.

According to the above configuration, at the transmitting side, signals of V- and H-polarizations are modulated from baseband signals to IF signals in the V/H modulators 1 and 2. After the modulation, the IF signals pass through the V/H transmitters 11 and 12, respectively, before being multiplied by outputs of the V/H transmitter local oscillators 15 and 16. In this manner, frequency conversion takes place from IF signals to RF signals. After the conversion, the RF signals are transmitted as radio waves of V- and H-polarizations from the V/H transmitting antennas 21 and 22, respectively.

At the receiving side, the V/H receiving antennas 23 and 24 receive radio waves of the V- and H-polarizations, respectively, which have travelled through a space from the transmitting side. The received radio waves of V- and H-polarizations respectively pass through the receivers 13 and 14 from the V/H receiving antennas 23 and 24 before being multiplied by outputs of the V/H receiver local oscillators 17 and 18. In this manner, frequency conversion takes place from RF signals to IF signals. After the conversion, the IF signals are output to the V/H demodulators 3 and 4, respectively, which demodulate the IF signals into baseband signals. At this time, in the V/H demodulator 3, a correlation between an error signal obtained from one polarization and a demodulation signal of the other polarization-side V/H demodulator 4 is obtained to compensate for cross polarization interference. A similar operation takes place even in the V/H demodulator 4.

According to the above transmission local synchronous method, outputs of the V/H transmitter local oscillators 15 and 16 (outputs of VCOs 151 and 161) are each controlled by the operation of the PLL circuits 152 and 162 so as to have the same frequency in synchronization with a common reference signal from the reference circuit 31.

According to the present exemplary embodiment, in response to control signals S3 and S4 from the V/H modulators 1 and 2, the V/H transmitter local oscillators 15 and 16 narrow the loop band of the PLL circuits 152 and 162 of the V/H transmitter local oscillators 15 and 16, for example, in the case of 16 QAM, which means that the QAM capacity is small. For example, in the case of 256 QAM, which means that the QAM capacity is large, the V/H transmitter local oscillators 15 and 16 control so as to widen the loop band of the PLL circuits 152 and 162 of the V/H transmitter local oscillators 15 and 16.

The following description is based on the above example shown in FIG. 5. In response to control signals S3 and S4 from the V/H modulators 1 and 2, the V/H transmitter local oscillators 15 and 16 control, in the case of, for example, 16QAM (Transmission capacity: several Mbits/Sec), which means the QAM capacity is small (first transmission capacity), so that the loop band of the PLL circuits 152 and 162 is narrower than integration range (1) (first integration range) of the V/H demodulators 3 and 4. For example, in the case of the example shown in FIG. 5, the loop band of the PLL circuits 152 and 162 is so controlled as to be narrower than about 100 Hz.

Meanwhile, in response to control signals S1 and S2 from the V/H modulators 1 and 2, the V/H transmitter local oscillators 15 and 16 control, in the case of for example, 256 QAM (Transmission capacity: several hundred Mbits/Sec), which means the QAM capacity is large (second transmission capacity), so that the loop band of the PLL circuits 152 and 162 is wider than the above case, to the extent that integration range (2) (second integration range) of the V/H demodulators 3 and 4 is not affected. For example, in the case of the example shown in FIG. 5, the loop band of the PLL circuits 152 and 162 is so controlled as to be wider than 100 Hz and reach up to about 1 kHz (About 1 kHz is desirable in the example shown in FIG. 5). In this case, at a low range side, the deterioration of the phase noise is larger than the former. However, there is no impact because the deterioration of the phase noise is outside the integration range.

Therefore, according to the present exemplary embodiment, in response to the control signals S3 and S4 from the V/H modulators 1 and 2, the loop band of the PLL circuits 152 and 162 of the V/H transmitter local oscillators 15 and 16 is controlled according to the magnitude of the QAM capacity (the first transmission capacity, and the second transmission capacity larger than the first transmission capacity). Therefore, the integrated value of phase noise of the V/H transmitter local oscillators 15 and 16 can be brought to the smallest value for each of the different QAM capacities. Thus, even when the system is multiple-valued so as to be of 256 QAM, whose transmission capacity is larger than 16 QAM, it is possible to curb the deterioration of an XPIC characteristic.

That is, according to the present exemplary embodiment, in response to the control signals S3 and S4 from the V/H modulators 1 and 2, the loop band of the PLL circuits 152 and 162 of the V/H transmitter local oscillators 15 and 16 is controlled. Therefore, it is possible to make the following factors equal: the frequencies of the V/H transmitter local oscillators 15 and 16 of one polarization and the other polarization. It is also possible to align the phases of the V/H transmitter local oscillators 15 and 16 of one polarization and the other polarization. Thus, it is possible to curb the deterioration of an XPIC characteristic that is attributable to the local phase noise of one polarization and the other polarization in the XPIC of a transmission reference synchronous type.

As described above, according to the present exemplary embodiment, in the XPIC system of a reference synchronous type, even when the system is multiple-valued so as to be of 128 QAM, 256 QAM or the like rather than 16 QAM or the like, it is possible to provide a means for preventing the deterioration in cross polarization interference compensation characteristics that is attributable to the local phase noise of one polarization and the other polarization.

Incidentally, according to the above exemplary embodiments, QAM is used as a multiple-valued modulation/demodulation method. However, the present invention is not limited to the above. For example, the following methods and other multiple-valued modulation/demodulation methods can be also employed: QPSK (Quadrature Phase Shift Keying) and BPSK (Binary Phase Shift Keying). According to the above exemplary embodiments, 256 QAM and 16 QAM are used to explain the magnitude of the transmission capacity. However, the present invention is not limited to the above. For example, QPSK, BPSK and QAM can be employed as long as the number of multiple values is greater than or equal to 16.

The above has described the present invention with reference to the exemplary embodiments. However, the present invention is not limited to the above exemplary embodiments.

Various modifications apparent to those skilled in the art may be made in the configuration and details of the present invention without departing from the scope of the present invention.

INDUSTRIAL APPLICABILITY

The present invention can be used for a dual polarization transmission system that uses a reference synchronous scheme in which transmission takes place using two orthogonal polarizations.

REFERENCE SIGNS LIST 1, 2: V/H modulator
3, 4: V/H demodulator
12: V/H transmitter
13, 14: V/H receiver
15, 16: V/H transmitter local oscillator (Transmitter local oscillator),
17, 18: V/H receiver local oscillator (Receiver local oscillator)
21, 22: V/H transmitting antenna
23, 24: V/H receiving antenna
30: Receiver reference circuit
31: Transmitter reference circuit

The invention claimed is:

1. A receiving device of a dual polarization transmission system that uses a reference synchronous scheme, the device comprising:
 a receiver that receives an RF signal that is transmitted with the use of two orthogonal polarizations;
 two reception local oscillators that include PLL circuits to convert the received RF signal of each of the polarizations into an IF signal; and
 a demodulator that demodulates an IF signal of one polarization, which is obtained by the conversion, into a baseband signal,
 wherein the reception local oscillators control a loop band of the PLL circuits in accordance with a transmission capacity in response to a signal from the demodulator, and
 wherein the reception local oscillators make, in response to a signal from the demodulator, the loop band of the PLL circuits of the reception local oscillators narrower than a first integration range of the demodulator at a time when the transmission capacity is a first transmission capacity, and the reception local oscillators control, at a time when the transmission capacity is a second transmission capacity that is larger than the first transmission capacity, so that the loop band of the PLL circuits of the reception local oscillators becomes widened to the extent that a second integration range of the demodulator is not affected.

2. A dual polarization transmission system, comprising the receiving device claimed in claim 1, wherein the dual polarization transmission system uses the receiving device to receive a signal that is transmitted by using two orthogonal polarizations.

3. A transmitting device of a dual polarization transmission system that uses a reference synchronous scheme, the device comprising:
 a modulator that modulates a baseband signal into an IF signal;
 a transmission local oscillator that includes a PLL circuit to convert an IF signal to an RF signal; and
 a transmitter that transmits the RF signal, which is obtained by the conversion, using two orthogonal polarizations,
 wherein the transmission local oscillator controls a loop band of the PLL circuit in accordance with a transmission capacity in response to a signal from the modulator, and
 wherein the transmission local oscillator makes, in response to a signal from the modulator, the loop band of the PLL circuit of the transmission local oscillator narrower than a first integration range of a receiving-side demodulator at a time when the transmission capacity is a first transmission capacity, and the transmission local oscillator controls, at a time when the transmission capacity is a second transmission capacity that is larger than the first transmission capacity, so that the loop band of the PLL circuit of the transmission local oscillator becomes widened to the extent that a second integration range of the demodulator is not affected.

4. A dual polarization transmission system, comprising the transmitting device claimed in claim 3, wherein the dual polarization transmission system uses the transmitting device to transmit a signal that should be transmitted by using two orthogonal polarizations.

5. A receiving method of a dual polarization transmission system that uses a reference synchronous scheme, comprising;
 receiving, at a receiver, an RF signal that is transmitted with the use of two orthogonal polarizations;
 converting, at two reception local oscillators including PLL circuits, the received RF signal of each of the polarizations into an IF signal;
 demodulating, at a demodulator, an IF signal of one polarization, which is obtained by the conversion, into a baseband signal; and
 controlling at the reception local oscillators, a loop band of the PLL circuits in response to a signal from the demodulator,
 wherein the reception local oscillators control a loop band of the PLL circuits in accordance with a transmission capacity in response to a signal from the demodulator, and
 wherein the reception local oscillators make, in response to a signal from the demodulator, the loop band of the PLL circuits of the reception local oscillators narrower than a first integration range of the demodulator at a time when the transmission capacity is a first transmission capacity, and the reception local oscillators control, at a time when the transmission capacity is a second transmission capacity that is larger than the first transmission capacity, so that the loop band of the PLL circuits of the reception local oscillators becomes widened to the extent that a second integration range of the demodulator is not affected.

6. A dual polarization transmission method, comprising receiving, with the use of the receiving method claimed in claim 5, a signal that is transmitted by using two orthogonal polarizations.

7. A transmitting method of a dual polarization transmission system that uses a reference synchronous scheme, comprising:
 modulating, at a modulator, a baseband signal into an IF signal;
 converting, at a transmission local oscillator including a PLL circuit, an IF signal to an RF signal;
 transmitting, at a transmitter, the RF signal, which is obtained by the conversion, using two orthogonal polarizations; and controlling, at the transmission local oscillator, a loop band of the PLL circuit in response to a signal from the modulator, wherein the transmission local oscillator controls a loop band of the PLL circuit in accordance with a transmission capacity in response to a signal from the modulator, and wherein the transmission local oscillator makes, in response to a signal from the modulator, the loop band of the PLL circuit of the transmission local oscillator narrower than a first integration range of a receiving-side demodulator at a time when the transmission capacity is a first transmission capacity, and the transmission local oscillator controls, at a time when the transmission capacity is a second transmission capacity that is larger than the first transmission capacity, so that the loop band of the PLL circuit of the transmission local oscillator becomes widened to the extent that a second integration range of the demodulator is not affected.

8. A dual polarization transmission method, comprising transmitting, with the use of the transmitting method claimed in claim 7, a signal that should be transmitted by using two orthogonal polarizations.

* * * * *